United States Patent [19]

Sneehan

[11] Patent Number: 5,273,562
[45] Date of Patent: Dec. 28, 1993

[54] SEPARATION AND STORAGE OF PARTICULATE SOLIDS

[75] Inventor: Patrick G. Sneehan, Bridgend, United Kingdom

[73] Assignee: Technivac Limited, Bridgend, United Kingdom

[21] Appl. No.: 980,783

[22] PCT Filed: Oct. 3, 1991

[86] PCT No.: PCT/GB91/01710

§ 371 Date: Feb. 12, 1993

§ 102(e) Date: Feb. 12, 1993

[87] PCT Pub. No.: WO92/05858

PCT Pub. Date: Apr. 16, 1992

[30] Foreign Application Priority Data

Oct. 6, 1990 [GB] United Kingdom ............... 9021764

[51] Int. Cl.⁵ ........................................... B01D 46/00
[52] U.S. Cl. ......................................... 55/344; 55/429; 55/432; 55/350.1; 406/171

[58] Field of Search ................. 55/344, 350, 428, 429, 55/432, 433; 406/171, 172

[56] References Cited

U.S. PATENT DOCUMENTS 4,372,713 2/1983 Klan ..................................... 406/172
4,574,420 3/1986 Dupye ............................. 55/432 X Primary Examiner—Charles Hart
Attorney, Agent, or Firm—Rodman & Rodman

[57] ABSTRACT

Apparatus is disclosed for separating particulate solids from a transport gas, the apparatus comprising outlet and inlet ducting extending respectively away from one towards a storage housing within which separation of solids from the transport gas occurs. The storage housing is provided with an openable outlet for the particulate material, the outlet being positioned above the level of an open topped receptacle for receiving the particulate material when the storage housing is suitably mounted on its mounting.

8 Claims, 3 Drawing Sheets

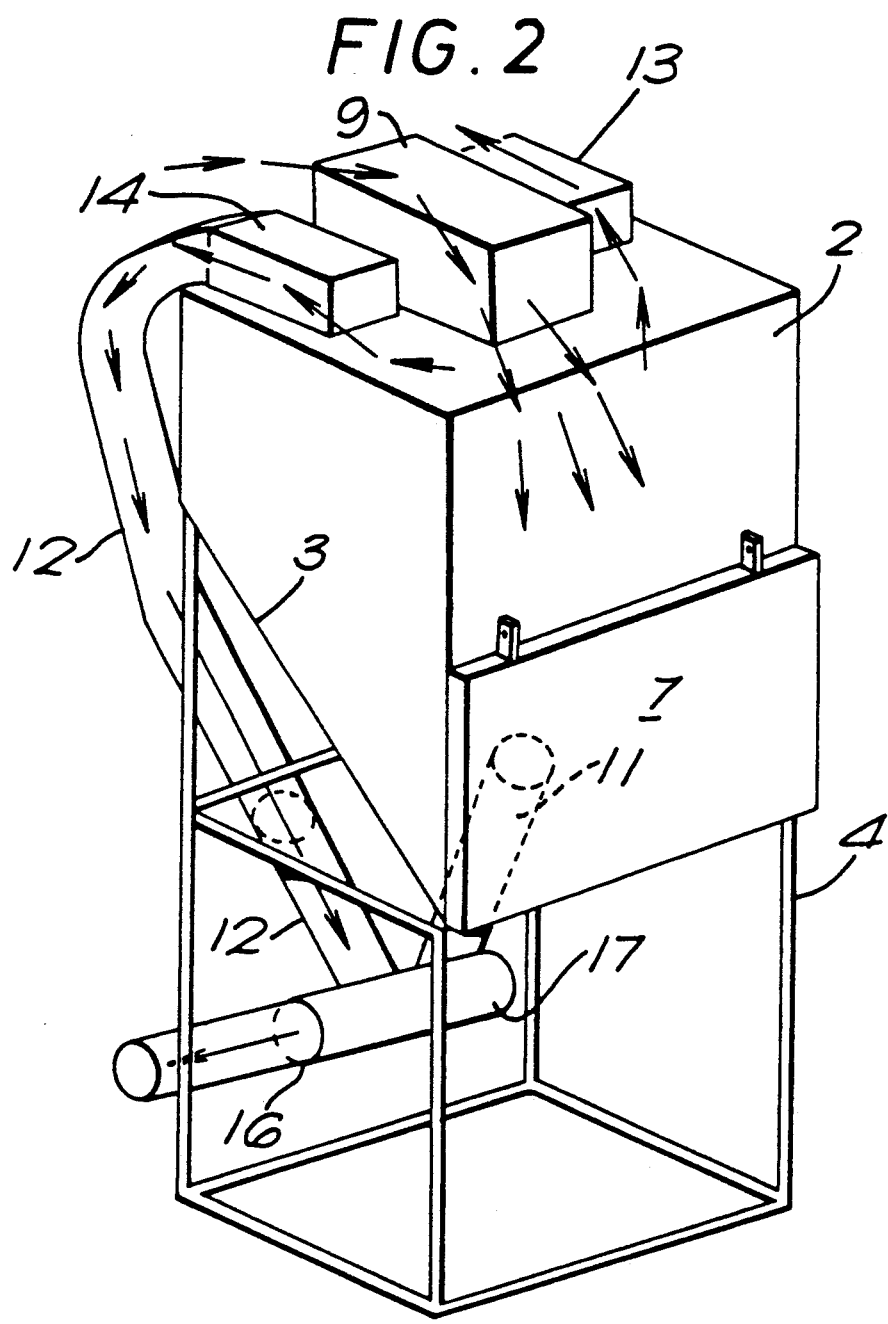

SEPARATION AND STORAGE OF PARTICULATE SOLIDS

This invention relates to apparatus for the separation of particulate solids from a transport gas, and subsequent storage thereof.

Vacuum separation units which are used within the vacuum loading industry are typically mounted on heavy goods vehicles within the range of 20 to 32 tons, and are fitted with their own material containers or tanks of around 10 to 15 cubic meter capacity.

Such vacuum units, which are mainly utilised for the extraction of both wet and dry materials from confined areas, must be disconnected from the extraction hose and the material transport the material to the tipping or holding area. which could be miles away from the extraction point. This transportation time, particularly for large quantities, can greatly extend the time to complete the work.

We have now devised apparatus which obviates some of the above mentioned difficulties.

According to the present invention therefore, there is provided apparatus for separating particulate solids from a transport gas, which apparatus comprises:

a) storage means, for deposition and storage therein of said particulate solids, said storage means having outlet means selectively openable and closable such that said particulate solids can be selectively discharged therefrom or retained therein:

b) inlet ducting means communicating between said storage means and a repository for said particulate solids remote from said storage means:

c) outlet ducting means communicating between said storage means and a location remote therefrom:

d) means for inhibiting flow of said particulate solids into said outlet ducting means:

e) means for inducing a flow of said transport gas from said repository through said inlet ducting means, storage means, and outlet ducting means; and f) mounting means for mounting thereon of said storage means such that the level of said outlet means is above the level of an open-topped receptacle to be filled with said particulate solids.

It is preferred that the storage means is in the form of a container such as a hopper or the like. Advantageously the container has a pivotably openable door, constituting the outlet means, preferably located in the region of the lowermost extent of the container. It is further preferred that the door is pivoted with a peripheral seal such that when in the closed position, a substantially airtight seal is effected between the door and the container.

The container is preferably provided with a sloping base portion such that when the outlet means is in the open position the particulate solids stored within the container may slide under gravity out of the container.

It is preferred that the inlet ducting means is in the form of a single inlet duct communicating with the storage means. Advantageously the outlet ducting means comprises a pair of outlet ducts arranged one either side the inlet duct. This ensures that the flow of the transport gas is "split" in two within the storage means which aids the deposition of the particulate solids within the storage means.

Advantageously, the means for inhibiting the flow of the particulate solids into the outlet ducting means will be in the form of a filtration unit, typically of muslin or gauze, provided for each outlet duct. The filtration units are typically located within the storage means (or container).

The means for inducting the flow of transport gas is preferably a pneumatic pump or compressor such as a vacuum pump or the like. It is preferred that the pneumatic pump is located downstream of the outlet ducting means.

Advantageously, the outer ducting means includes valving means selectively operable to alter the flow of gas within the apparatus, such that flow of transport gas along said inlet ducting means can be caused to substantially cease. Preferably this is achieved by providing a valve in the outlet ducting means through which, when opened, atmospheric air can be drawn directly through the pneumatic pump.

The mounting means may be a frame such as a scaffolding frame or the like.

The invention will now be further described in a specific embodiment, by way of example only, with reference to the accompanying drawings, in which, FIG. 1 is a perspective view of apparatus according to the invention.

FIG. 2 is a schematic perspective view of the apparatus of FIG. 1.

FIG. 3b is a schematic side view of the part of FIG. 3a: and

Figure 1:
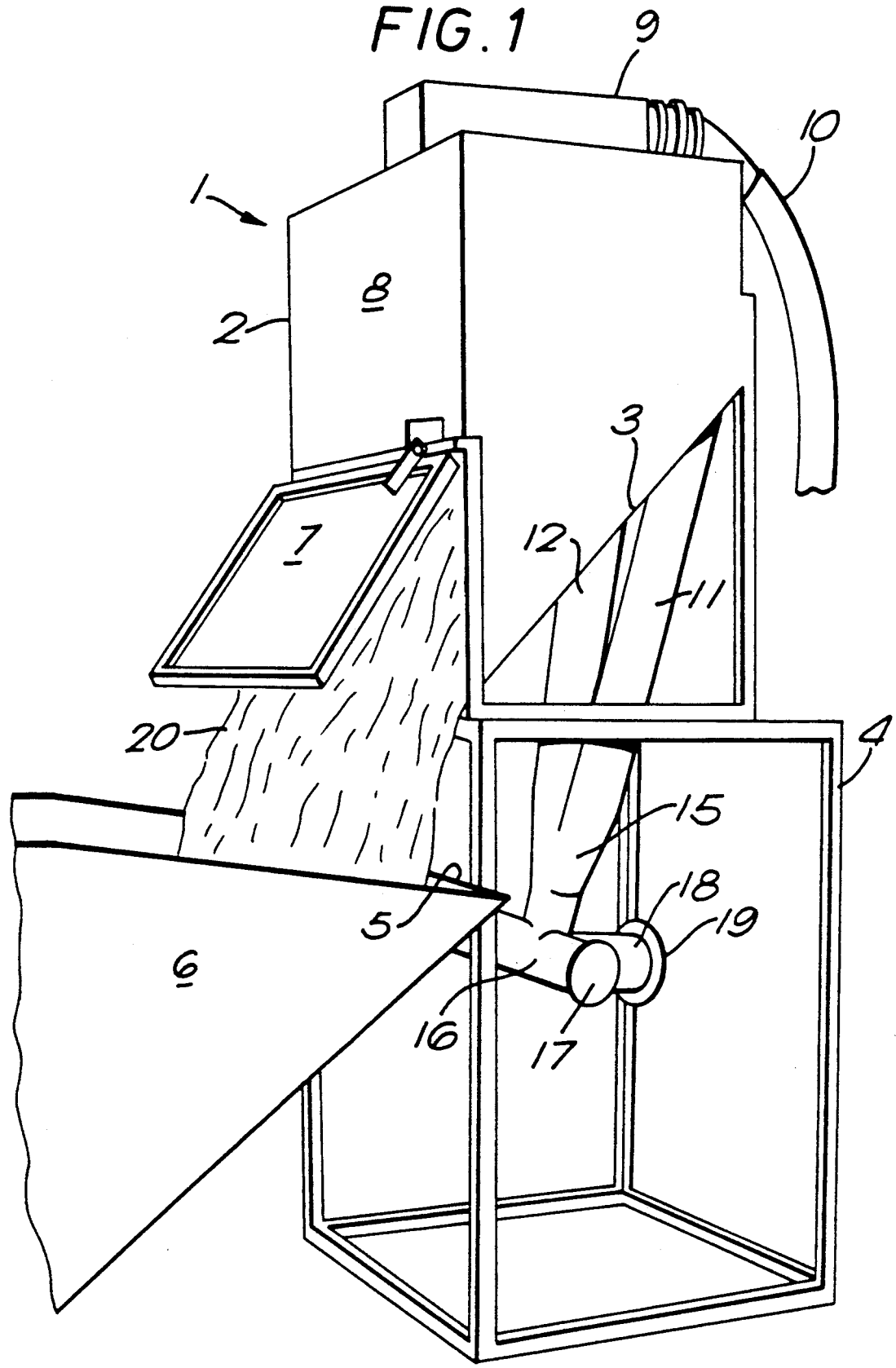

Referring to the drawings, the apparatus generally designated 1 consists of a hopper or container 2 having a generally downwardly sloping base portion 3 which is mounted on a frame 4 such that the lowermost extent of the sloping base 3 is at a position above the lip 5 of an open-topped skip 6. A hinged trap door 7 is located in the front wall 8 of the hopper 2 which selectively closes or opens the lower part of the hopper 2. A seal (not shown) runs around the periphery of the inner surface of the door 7 such that when in the closed position, the lower portion of the hopper is air sealed.

A transport gas/particulate material inlet manifold 9 communicates with the interior of the hopper 2, and is connected to an inlet pipe 10 which extends from a store for particulate material (not shown).

Outlet pipes 11, 12 are connected via filtration units 13, 14 to the hopper so as to communicate with the interior thereof. The pipes 11 and 12 extend downwardly to a confluence region 15 before connecting with a main suction manifold 16 which is closed at one end 17 and connected at its distal end to a vacuum pump unit (not shown).

A short pipe 18 extends outwardly from the main suction manifold and is closed with a removable pressure relief plate 19.

Figure 3A:
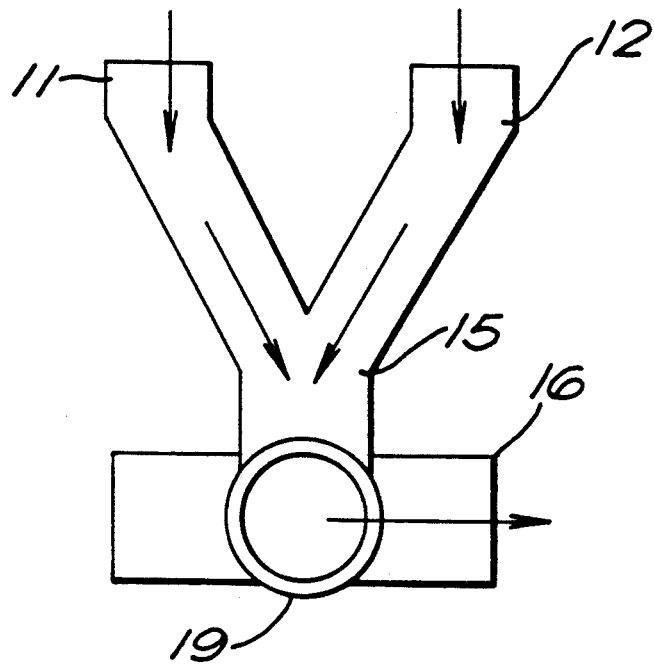
FIG. 3a is a schematic rear view of a part of the apparatus of FIGS. 1 and 2.
Figure 3B:
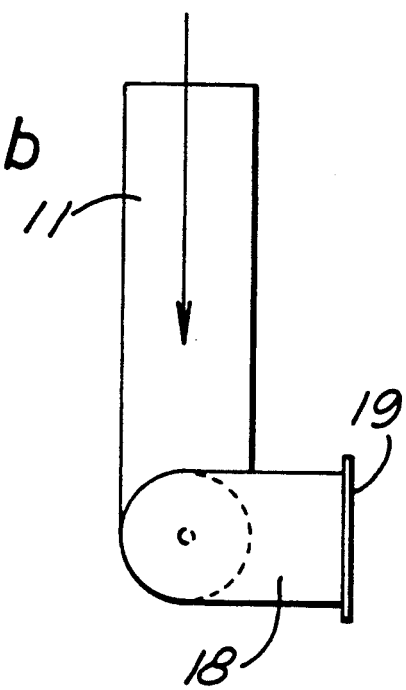
Figure 3C:
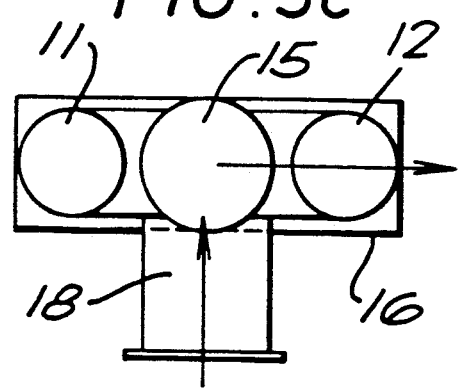
FIG. 3c is a schematic plan view of the part of FIGS. 3a and 3b.

With the sealed door 7 and relief plate 19 in their respective closed positions (FIGS. 2 and 3a, 3b), a flow path is defined from the particulate material store along the inlet pipe 10, into the interior of the hopper 2 via the inlet manifold 9, out of the hopper 2 via the filtration units 13, 14 and along the main suction manifold 16 to the vacuum pump.

When the vacuum pump is operated, a mixture of air, the transport gas and the particulate material in the store is sucked along the inlet pipe 10 entering the interior of the hopper 2 via the inlet manifold 9. In the hopper 2, the air flow is divided, half passing into outlet pipe 11 and half into outlet pipe 12. The division of air flow causes a large proportion of the particulate material transported thereby to be deposited in the base of the hopper. The filter units, which are typically gauze or muslin filters, prevent any of the particulate material being sucked down the outlet pipes 11 and 12, ensuring that essentially all of the particulate material entering is deposited in the hopper 2.

The filtered air then flows via outlet pipes 11 and 12 and the main suction manifold 16 out through the vacuum pump. (It should be noted here that the filtered air may, having passed through the vacuum pump, be recirculated back to the particulate material store to act as the transport gas once more).

When the hopper 2 is full with the particulate matter, the relief plate 19 is removed from pipe 18 causing the air flow path within the apparatus to alter with air now only being sucked into the pipe 18 along the main suction manifold 16 and out through the vacuum pump (see FIG. 3*c*). As a result no further air/particulate matter mixture is sucked into the hopper 2.

At this point, the hinged trap door 7 is opened allowing the particulate material 20 to slide under gravity along the sloping base 3 and out of the hopper 2 in to the waiting open-topped skip 6 positioned below. Once the hopper 2 has been emptied the door 7 is sealed shut once more, and the plate 19 replaced to resume suction of the particulate matter from the store along the inlet pipe 10 to the hopper 2.

The apparatus enables a skip to be filled easily and efficiently with a minimum of "down time" since material may be deposited in the sealed hopper 2 whilst a full skip is replaced or removed. Furthermore, the apparatus is particularly suitable for use with flexible one cubic meter bags (known as IBC's) where the hopper can be dismensioned to contain one bag full of particulate material as a maximum.

Since the hopper 2 is demountable from the frame 4, the apparatus is easily transportable to wherever needed, and frames 4 of various height may be used where skips or other containers of various heights are being used.

I claim:

1. Apparatus for separating particulate solids from a transport gas, which apparatus comprises:

(a) storage means, for deposition and storage therein of said particulate solids, said storage means having outlet means selectively openable and closable such that said particulate solids can be selectively discharged therefrom or retained therein;

(b) an inlet duct communicating between said storage means and a repository for said particulate solids remote form said storage means;

(c) outlet ducting means comprising a pair of outlet ducts arranged one either side the inlet duct and communicating between said storage means and a location remote therefrom;

(d) means for inhibiting flow of said particulate solids into said outlet ducting means;

(e) means for inducing a flow of said transport gas from said repository through said inlet ducting means, storage means, and outlet ducting means; and (f) mounting means for mounting thereon of said storage means such that the level of said outlet means is above the level of an open-topped receptacle to be filled with said particulate solids.

2. Apparatus according to claim 1, wherein the storage means comprises a hopper.

3. Apparatus according to claim 1, wherein the outlet means comprises a pivotally openable door provided in the region of the lowermost extent of the storage means.

4. Apparatus according to claim 1, wherein the storage means has a sloping base portion, such that when the outlet means is in the open position the particulate solids stored within the storage means may slide under gravity out of the storage means.

5. Apparatus according to claim 1, wherein the means for inhibiting the flow of the particulate solids into the outlet ducts is a respective filtration unit, one for each outlet duct.

6. Apparatus according to claim 1, wherein the outlet ducting means includes valving means selectively operable to alter the flow of gas within the apparatus, such that flow of transport gas along said inlet ducting means can be caused to substantially cease.

7. Apparatus according to claim 6, wherein a valve is provided in the outlet ducting means through which atmospheric air may be drawn.

8. Apparatus according to claim 1, wherein the means for inducing the flow of transport gas is positioned downstream of the outlet ducting means.

* * * * *